United States Patent

Shibata et al.

[11] Patent Number: 5,207,091
[45] Date of Patent: May 4, 1993

[54] CONTROL SYSTEM WITH MALFUNCTION DETECTING DEVICE FOR USE IN MOTOR VEHICLE

[75] Inventors: Hiroshi Shibata, Kariya; Takaaki Baba, Anjo; Kazunobu Morimoto, Aichi; Masao Ito, Nagoya, all of Japan

[73] Assignee: Nippondenso Co., Ltd., Kariya, Japan

[21] Appl. No.: 669,852

[22] Filed: Mar. 15, 1991

[30] Foreign Application Priority Data

Mar. 16, 1990 [JP] Japan .................................. 2-67795

[51] Int. Cl.⁵ ........................ G01M 19/00; H03M 1/10
[52] U.S. Cl. ................................... 73/118.1; 73/117.3; 341/120
[58] Field of Search .................. 73/118.1, 117.3, 1 R, 73/866.4; 341/120

[56] References Cited

U.S. PATENT DOCUMENTS

| | | | |
|---|---|---|---|
| 4,175,427 | 11/1979 | Blanke | 73/118.1 |
| 4,325,251 | 4/1982 | Kenegae | 73/119 A |
| 4,546,646 | 10/1985 | Takahashi | 73/117.3 |
| 4,571,725 | 2/1986 | Nagashima et al. | 341/120 |
| 4,700,563 | 10/1987 | Iwata et al. | 73/118.1 |
| 4,780,826 | 10/1988 | Nakaro et al. | 73/117.3 |
| 4,928,242 | 5/1990 | Suzuki | 73/118.1 |
| 4,973,974 | 11/1990 | Suzuki | 341/120 |
| 4,989,570 | 2/1991 | Kuribara et al. | 73/118.1 |

FOREIGN PATENT DOCUMENTS

| | | |
|---|---|---|
| 54-10814 | 1/1979 | Japan . |
| 55-35313 | 11/1979 | Japan . |
| 54-141926 | 11/1979 | Japan . |
| 55-174601 | 12/1980 | Japan . |
| 56-6134 | 1/1981 | Japan . |
| 58-203516 | 11/1983 | Japan . |
| 63-67540 | 3/1988 | Japan . |

*Primary Examiner*—Hezron E. Williams
*Assistant Examiner*—George Dombroske
*Attorney, Agent, or Firm*—Cushman, Darby & Cushman

[57] ABSTRACT

A control system with an abnormality detecting device for use in a motor vehicle. The control system comprises a microcomputer coupled through a switching circuit and an analog-to-digital converter to a sensor for sensing an operating state of the motor vehicle and also to a reference voltage generating circuit. The switching circuit performs a switching operation between an analog signal from the sensor and a predetermined reference voltage signal from the reference voltage generating circuit to supply the analog-to-digital converter with one of the analog signals which is analog-to-digital-converted in the analog-to-digital converter. The microcomputer has a first decision function which decides that the output signal of the analog-to-digital converter to be coupled to the sensor is out of a predetermined range, and further has a second decision function which decides that the output signal of the analog-to-digital converter to be coupled to the reference voltage generating circuit is different from a predetermined value. In accordance with the decision result, the second decision function decides that the sensor or analog-to-digital converter circuit is in an abnormal state. This arrangement can selectively and adequately detect the malfunction of the sensor or analog-to-digital converter.

9 Claims, 2 Drawing Sheets

CONTROL SYSTEM WITH MALFUNCTION DETECTING DEVICE FOR USE IN MOTOR VEHICLE

BACKGROUND OF THE INVENTION

The present invention relates generally to control systems for use in motor vehicles, and more particularly to control systems equipped with a malfunction detecting device for checking the abnormality of instruments such as an analog-to-digital converter (which will hereinafter be referred to as an A/D converter) and various sensors.

For control of a motor vehicle, an electronic control unit generally comprising a microcomputer is responsive to the output signals of various sensors after converted into the corresponding digital signal through an A/D converter. When the value of the reception signal shows an abnormality, that is, when it is out of the normal range, the electronic control unit informs the user of the abnormality. There is a problem, however, in that it is difficult to identify which device is not functioning properly, i.e., whether or not the A/D converter or the sensor is abnormal, thereby preventing an effective repair or exchange of the device.

SUMMARY OF THE INVENTION

It is therefore an object of the present invention to provide a control system for use in a motor vehicle which is capable of adequately identifying the abnormal device so as to easily repair or exchange the device.

According to the present invention, the control system comprises a microcomputer coupled through a switching circuit and an analog-to-digital converter to a sensor for sensing an operating state of the motor vehicle and further to a reference voltage generating circuit for generating a predetermined reference voltage signal. In response to a control signal from the microcomputer, the switching circuit performs a switching operation between an analog signal from the sensor and the predetermined reference voltage signal from the reference voltage generating circuit to supply the analog-to-digital converter with one of the analog signal and the predetermined reference voltage signal which is in turn analog-to-digital-converted in the analog-to-digital converter. The microcomputer has a first decision function which determines that the output signal of the analog-to-digital converter coupled to the sensor is out of a predetermined range, and further has a second decision function which determines that the analog-to-digital converter or the sensor is in an abnormal state by taking into account the result of the first decision function. That is, in cases where the first decision function determines that the output signal of the analog-to-digital converter coupled to the sensor is abnormal, the microcomputer operates the switching circuit so that the predetermined reference voltage signal from the reference voltage generating circuit is supplied through the analog-to-digital converter to the microcomputer. In this condition, the second decision function checks the output signal of the analog-to-digital converter coupled to the reference voltage generating circuit. If it is abnormal, the second decision function decides that the analog-to-digital converter is in an abnormal state. On the other hand, if it is normal, the second decision function decides that the sensor is in an abnormal state. This arrangement can selectively and adequately detect the malfunction of the sensor or analog-to-digital converter.

BRIEF DESCRIPTION OF THE DRAWINGS

The present invention will be described in further detail with reference to the accompanying drawings, in which.

DETAILED DESCRIPTION OF THE INVENTION

Figure 1:
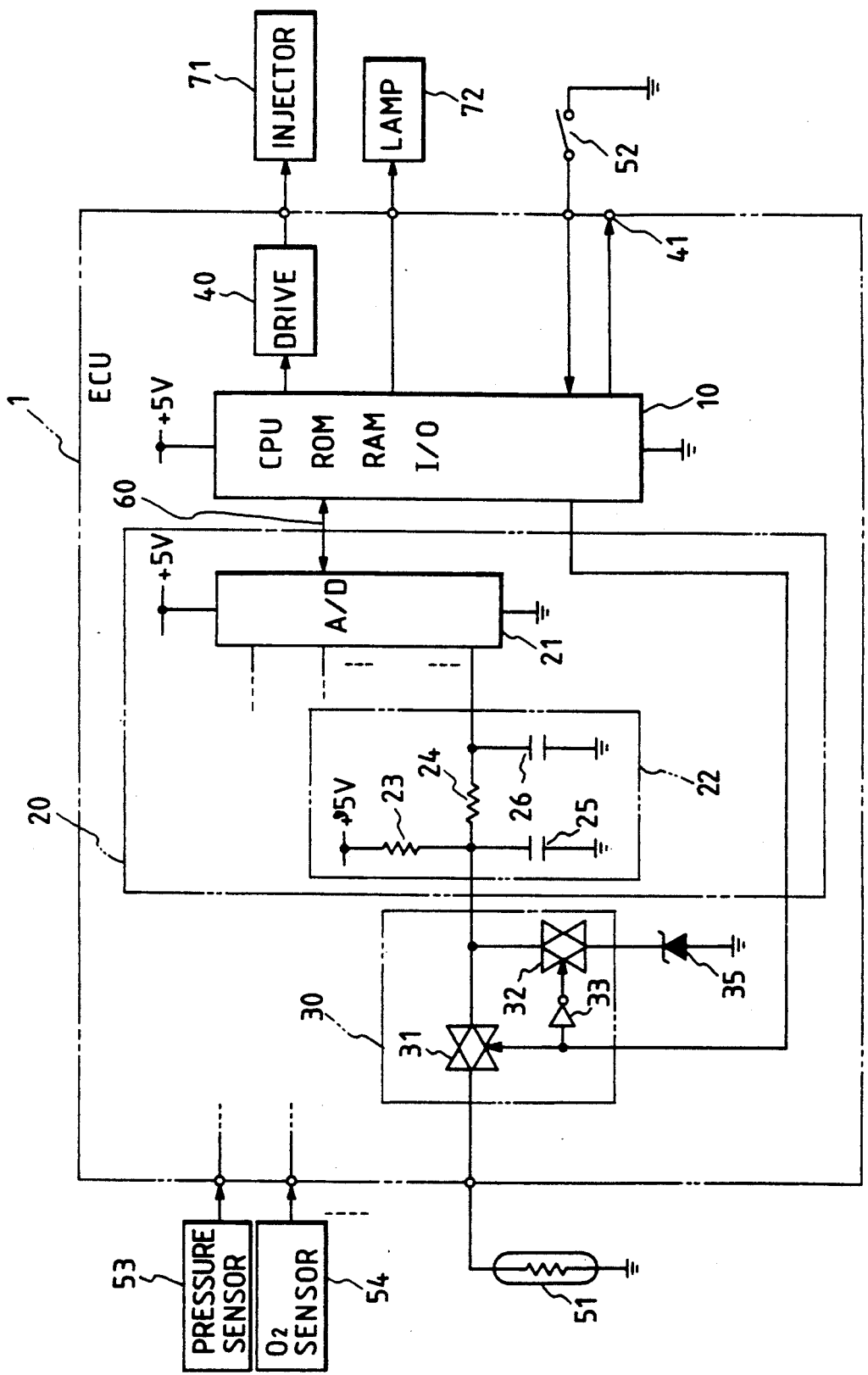
FIG. 1 is a block diagram showing a control system according to a preferred embodiment of the present invention.

Referring now to FIG. 1, there is illustrated an electronic control unit (ECU) according to a preferred embodiment of the present invention which is employed for a fuel injection control system of a motor vehicle. In FIG. 1, the electronic control unit illustrated at numeral 1 is composed of a microcomputer comprising a central processing unit (CPU), a read-only memory (ROM), a random access memory (RAM), an input/output port and others. Also included in the electronic control unit 1 are an A/D converting circuit 20, a switching circuit 30 and a drive circuit 40. The microcomputer 10 (for example, 68HC05 manufactured by Motorola Co., Ltd) receives signals to be supplied from a cooling water temperature sensor 51, a pressure sensor 53, an oxygen ($O_2$) concentration sensor 54 and others through the A/D converting circuit 20 and a communication line 60 so as to calculate a fuel injection amount into the vehicle engine on the basis of the signals from the sensors, the output signal of the microcomputer 10 being supplied to the drive circuit 40, thereby operating an injector 71. In addition, the microcomputer 10 has a malfunction detecting device for detecting abnormalities of the A/D converting circuit 20 and the various sensors coupled thereto. If an abnormality is detected, the microcomputer 10 lights a lamp 72, and then checks whether the circuit is currently being repaired, on the basis of a signal from a service switch 52 which may be activated in a repairing factory.

The A/D converting circuit 20 comprises an A/D converter (for example, NEC-manufactured μPD7094) and a filter circuit 22. The filter circuit 22 is a well-known noise-eliminating low pass filter comprising resistors 23, 24 and capacitors 25, 26. The switching circuit 30 is composed of analog switches (for example, Toshiba-manufactured TC4066) 31, 32 and an inverter 33. The analog switches 31 and 32 are controlled through the microcomputer 10 and are arranged such that one is in the ON state when the other is in the OFF state.

An output terminal of the cooling water temperature sensor 51 is coupled through the analog switch 31 of the switching circuit 30 and the filter circuit 22 to the A/D converter 21. Similarly, the pressure sensor 53 and the $O_2$ sensor 54 are respectively coupled through switching circuits and filter circuits (not shown) to a different port of the A/D converter 21. Further, the analog switch 32 of the switching circuit 30 is connected to a reference voltage circuit 35 comprising a Zener diode.

Figure 2:
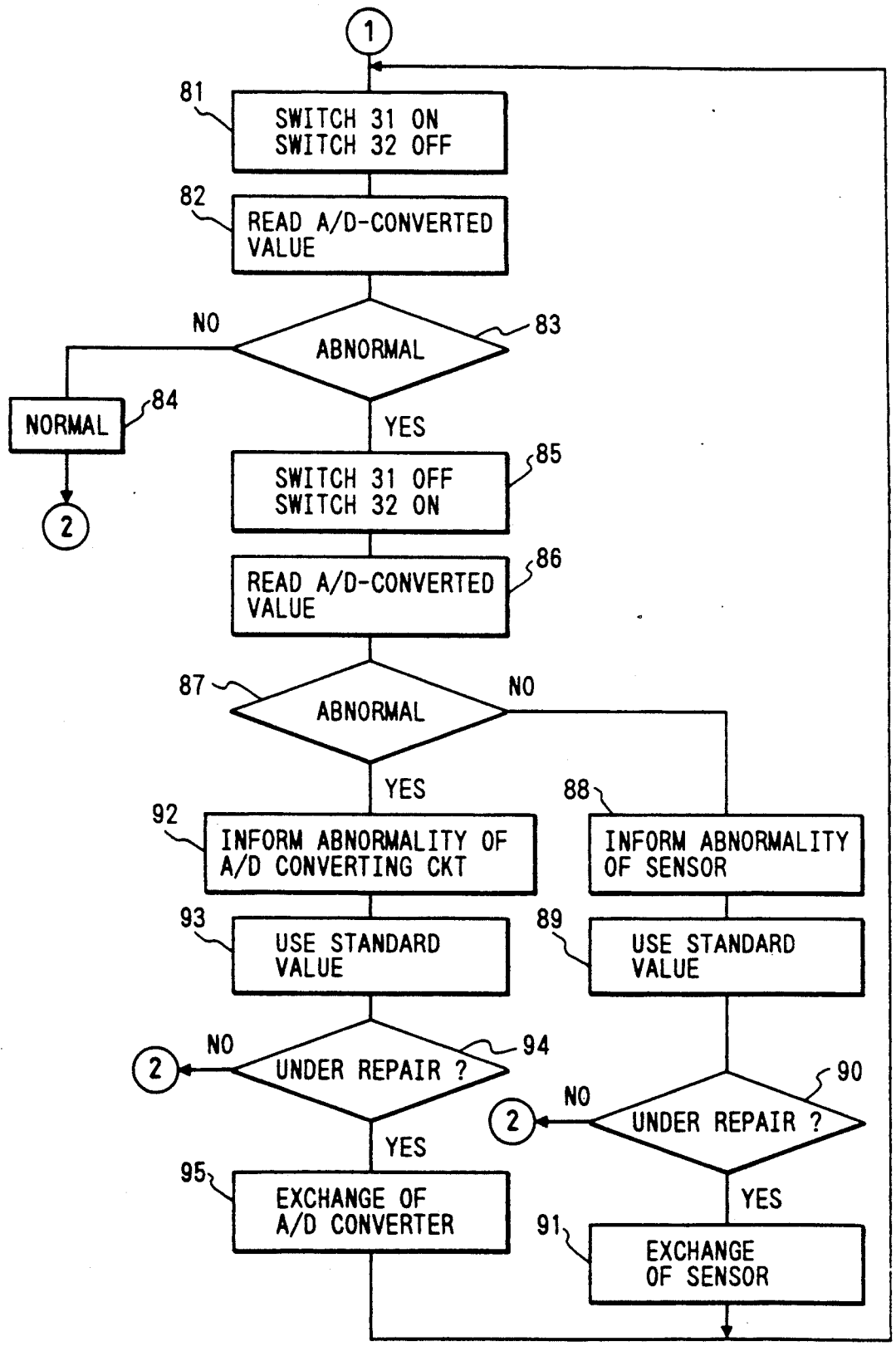
FIG. 2 is a flow chart showing the operation of the control system illustrated in FIG. 1.

With the above-described arrangement, the microcomputer 10 starts the calculation process in accordance with a program previously inputted into the ROM. The description for the calculation of the fuel injection amount will be omitted because it is well known in the art, but a description will be made below with reference to FIG. 2 in terms of the abnormality detecting operation to be executed in an interrupt routine.

The operation begins with a step 81 to turn on the switch 31 and turn off the switch 32 so as to supply the A/D converter 21 with a voltage corresponding to a resistance of the cooling water temperature sensor 51. The A/D converter 21 converts the inputted voltage into a digital signal which is in turn led to the microcomputer 10. In a subsequent step 82, the microcomputer 10 receives the A/D converted value, thereafter followed by a step 83 (a first decision means) so as to check whether this A/D converted value is abnormal. If the A/D converted value is a normally taken value, that is, if it is a value within the normal range (for example, several tens to 100 kiloohms in resistance conversion), a step 84 follows to set a flag so as to indicate that the A/D converted value is normal. Here, if the flag has been set to indicate the abnormality, the state of this flag is released, before terminating this routine.

On the other hand, if the A/D converted value is out of the normal range, the decision is made that it is abnormal, and is then followed by a step 85 to turn off the switch 31 and turn on the switch 32 whereby the cooling water temperature sensor 51 is separated from the A/D converter 21 and the reference voltage (for example, 2.5 V), depending on the Zener diode 35, is inputted through the filter circuit 22 to the A/D converter 21. In a step 86, the microcomputer 10 receives the A/D converted value of this reference voltage, and is then followed by a step 87 so as to judge this value to check whether the reference voltage is accurately A/D-converted (a second decision means corresponding to the above-mentioned steps 85 to 87). If the reference voltage is adequately A/D-converted, the decision is made such that the A/D converting circuit 20 is in a normal state and the cooling water temperature sensor 51 is in an abnormal state. Thereafter, a step 88 follows to light the lamp 72 to give a warning in terms of the fact that the cooling water temperature sensor 51 is in the abnormal state. Sinultaneously with this warning, the microcomputer 10 writes, into its backup RAM, a code representing the abnormality of the cooling water temperature sensor 51.

A subsequent step 89 is provided for setting an abnormal flag representing that a standard value stored in advance in the ROM is used instead of the information from the cooling water temperature sensor 51. This standard value will be kept until this cooling water temperature sensor 51 is replaced with a new one and a decision is made that the new sensor is normal. After the execution of the step 89, a step 90 is executed to check whether or not the service switch 52 is in the ON state. If the service switch 52 is in the OFF state representing that the cooling water temperature sensor 51 is not under repair, this routine terminates. On the other hand, if the service switch 52 is in the ON state representing that the cooling water temperature sensor 51 is under repair, a step 91 follows to output a signal through a judgment code output terminal 41 to demand the replacement of the cooling water temperature sensor 51. The service switch 52 may be operated in the factory. Thereafter, the operational flow returns to the initial state 81.

On the other hand, if the answer of the step 87 is affirmative, that is, if the reference voltage is inadequately A/D-converted, the decision is made such that the cooling water temperature 51 is in the normal state and the A/D converting circuit 20 is in an abnormal state. A step 92 follows to light the lamp 72 so as to give a warning in terms of the fact that the A/D converting circuit 20 is in the abnormal state. Simultaneously with this warning, the microcomputer 10 writes, into its backup memory, a code representing that the A/D converting circuit 20 in the abnormal state. A subsequent state 93 is provided in order to set an abnormal flag representing that standard values in advance stored in the ROM are used instead of all the A/D conversion information. These standard values will be kept until the A/D converting circuit 20 is exchanged with a new one and a decision is made that the new A/D converting circuit 20 is normal. A step 94 is then executed so as to check whether the service switch 52 is in the ON state. If this switch 52 is in the OFF state representing that the A/D converting circuit 20 (the electronic control unit 1) is not under repair, this routine terminates. On the other hand, if the switch 52 is in the ON state representing that it is under repair, the operation advances to a step 95 to output a signal through the judgment code output terminal 41 to demand the replacement of the A/D converting circuit 20.

As obvious from the above description, this operation can selectively judge the sensor and the A/D converting circuit, thereby allowing an adequate countermeasure. When the decision is made that the A/D converting circuit is in the abnormal state, the A/D converting circuit is replaced with a new one, while the entire circuit is not always required to be replaced. In this case, the exchange of the portion such as the filter circuit and A/D converter is preferable, thereby preventing a wasteful exchange. Further, note here that, in the case that the malfunction occurs irrespective of the exchange of the A/D converting circuit, the decision can be made such that a portion of the microcomputer coupled to the A/D converting circuit is in an abnormal state. In this case, the microcomputer is replaced with a new one.

It should be understood that the foregoing relates to only a preferred embodiment of the present invention, and that it is intended to cover all changes and modifications of the embodiments of this invention herein used for the purposes of the disclosure, which do not constitute departures from the spirit and scope of the invention.

What is claimed is:

1. A control system for use in a motor vehicle comprising:
   sensor means for sensing an operating state of said motor vehicle and outputting an analog sensor signal indicative thereof;
   reference voltage generating means for generating a predetermined reference voltage signal;
   analog-to-digital converting means for converting an inputted analog signal into a digital signal;
   switching means, connected to said sensor means, said analog-to-digital converting means and said reference voltage generating means, for switching between said analog sensor signal and said predetermined reference voltage signal and supplying said analog-to-digital converting means with one of said analog sensor signal and said predetermined reference voltage signal;
   first decision means for deciding whether a first output signal represents an abnormal value, said first output signal being a signal obtained by said analog-to-digital converting means converting said analog sensor signal to a digital sensor signal; and second decision means for activating said switching means, after said first decision means determines that said first output signal represents said abnormal value, so that said predetermined reference voltage signal is supplied from said reference voltage generating means to said analog-to-digital converting means and for determining whether a second output signal represents said predetermined reference voltage signal, said second output signal being a signal obtained by said analog-to-digital converting means converting said predetermined reference voltage signal to a digital reference voltage signal.

2. A system as claimed in claim 1, wherein said first decision means comprises means for determining that said first output signal represents said abnormal value when a value of said first output signal is not within a predetermined range of values.

3. A system as claimed in claim 2, wherein said second decision means comprises means for activating said switching means to connect said reference voltage generating means to said analog-to-digital converting means if said first decision means determines that said first output signal represents an abnormal value and said second decision means compares said second output signal to a second predetermined value, thereby determining that said sensor means is defective when said second output signal corresponds to said second predetermined value and that said analog-to-digital converting means is defective when said second output signal does not correspond to said second predetermined value.

4. A system as claimed in claim 3, wherein said first decision means uses a predetermined value instead of a signal from said sensor means to control said motor vehicle when said sensor means is defective.

5. A system as claimed in claim 3, wherein said second decision means uses a predetermined value instead of a signal from said analog-to-digital converting means to control said motor vehicle when said analog-to-digital converting means is defective.

6. A system as claimed in claim 3, wherein said second decision means comprises means for activating said switching means to cause said analog-to-digital converting means to be coupled to said reference voltage generating means when said first output signal of said analog-to-digital converting means coupled to said sensor means is abnormal.

7. An abnormality detection method for detecting an abnormal state of a motor vehicle control system having an analog-to-digital converter and sensors, comprising the steps of:

sensing an operating state of said motor vehicle with said sensors and outputting an analog sensor signal indicative thereof;

converting said analog sensor signal into a first digital signal with an analog-to-digital converter;

detecting a first abnormal value of said first digital signal;

generating a reference voltage;

converting said reference voltage into a second digital signal with an analog-to-digital converter;

detecting a second abnormal value of said second digital signal;

generating a first abnormal signal indicative of a defective analog-to-digital converter according to a detection of said second abnormal value after a detection of said first abnormal value; and generating a second abnormal signal indicative of a defective sensor according to a detection of said first abnormal value only.

8. An abnormality detection method as claimed in claim 7, further comprising the steps of:

memorizing a defective state of said analog-to-digital converter according to said first abnormal signal; and memorizing a defective state of said sensor according to said second abnormal signal.

9. An abnormality detection method as claimed in claim 7, further comprising the steps of:

generating a warning signal indicative of said defective analog-to-digital converter; and generating a warning signal indicative of said defective sensor.

* * * * *